United States Patent
Eriksson

(10) Patent No.: US 6,530,728 B2
(45) Date of Patent: Mar. 11, 2003

(54) ROTATABLE TOOL HAVING A REPLACEABLE TIP AT THE CHIP REMOVING FREE END OF THE TOOL

(75) Inventor: Henrik Eriksson, Alunda (SE)

(73) Assignee: Sandvik AB, Sandviken (SE)

( * ) Notice: Subject to any disclaimer, the term of this patent is extended or adjusted under 35 U.S.C. 154(b) by 0 days.

(21) Appl. No.: 09/899,161

(22) Filed: Jul. 6, 2001

(65) Prior Publication Data
US 2002/0015623 A1 Feb. 7, 2002

(30) Foreign Application Priority Data
Jul. 6, 2000 (SE) .............................. 0002540

(51) Int. Cl.[7] .............................. B23B 51/02
(52) U.S. Cl. ................... 408/233; 408/230; 408/713
(58) Field of Search ............... 408/144, 227, 408/230, 231, 233, 713

(56) References Cited

U.S. PATENT DOCUMENTS

| 3,548,688 A | * | 12/1970 | Kuch ........................ 403/339 |
| 4,854,789 A | * | 8/1989 | Evseanko, Jr. .............. 408/125 |
| 5,228,812 A | 7/1993 | Noguchi et al. | |
| 5,599,145 A | * | 2/1997 | Reinauer et al. ............ 408/229 |
| 5,957,631 A | * | 9/1999 | Hecht ........................ 408/144 |
| 5,971,673 A | * | 10/1999 | Berglund et al. ........... 408/1 R |
| 6,059,492 A | 5/2000 | Hecht | |
| 6,012,881 A | 7/2000 | Scheer | |
| 6,109,841 A | * | 8/2000 | Johne ........................ 408/144 |
| 6,276,879 B1 | * | 8/2001 | Hecht ........................ 279/93 |

FOREIGN PATENT DOCUMENTS

| DE | 196 05 157 | 9/1998 |
| EP | 0 118 806 | 9/1984 |

* cited by examiner

Primary Examiner—Daniel W. Howell
(74) Attorney, Agent, or Firm—Burns, Doane, Swecker & Mathis, LLP

(57) ABSTRACT

A rotatable tool has a replaceable tip mounted thereon. The tool includes a tool body having a cutting seat in which the tip is received. The tip has edges for chip removing machining. The cutting seat and the replaceable tip have mutually cooperating support surfaces extending transverse to the longitudinal center axis of the tool. The cutting seat and the replaceable tip have mutually cooperating guide surfaces which are symmetrical about the longitudinal center axis as well as clamp portions for clamping the replaceable tip in the axis direction of the tool. A locking screw is received in the tool body to bring the replaceable tip into cooperation with the clamping portions.

10 Claims, 5 Drawing Sheets

12 # ROTATABLE TOOL HAVING A REPLACEABLE TIP AT THE CHIP REMOVING FREE END OF THE TOOL

This application claims priority under 35 U.S.C. §§118 and/or 365 to Patent Application Serial No. 0002540-3 filed in Sweden on Jul. 6, 2000, the entire content of which is hereby incorporated by reference.

TECHNICAL FIELD OF THE INVENTION

The present invention relates to a rotatable tool, preferably, a drill or a milling cutter, having a replaceable tip at the chip removing free end of the tool. The tool also comprises a tool body having a cutting seat, in which the tip is intended to be received, and also having helicoidal or straight chip channels. The tip has members for chip removing machining. The cutting seat and the replaceable tip have mutually cooperating support surfaces extending both in the longitudinal direction of the tool and transverse to the longitudinal direction of the tool. The invention also relates to the tip separately.

PRIOR ART

A tool, in the form of a drill, of the above-defined kind is previously known from the manufacturer Gühring Inc. of Wisconsin, U.S.A., in which the drill tip is clamped in the cutting seat thereof by means of two screws. One of the screws is a stop screw, the position of which is fixed in the factory, while the second screw is a tightening screw, which is fastened manually in connection with the drill tip being assembled in the cutting seat thereof. The tightening screw is provided with a conical tip in order to clamp the loose drill tip in the axial direction of the tool. The cutting seat has parallel side surfaces.

SUMMARY OF THE INVENTION

A primary aim of the present invention is to describe a tool of the above-defined kind, where the replaceable tip is assembled in the cutting seat thereof in the tool body in a simple and user-friendly way.

Another aim of the present invention is that the tool should be balanced as regards the forces acting on the tool.

Yet another aim of the present invention is that the cutting forces should act towards the center and clamp the cutting insert.

The present invention relates to a rotatable tool having a replaceable tip mounted at a front end of the tool. The tool comprises a tool body having a cutting seat in which the tip is received. The tool body has chip channels for removing cuttings. The tip has cutting edges for chip removing machining. The cutting seat and the replaceable tip have mutually cooperating support surfaces extending both in the longitudinal direction of the tool and transversely to the longitudinal direction of the tool. The cutting seat and the replaceable tip have mutually cooperating guide surfaces configured symmetrically about a longitudinal center axis of the tool. The cutting seat and the replaceable tip have mutually cooperating clamping portions for clamping the replaceable tip in the axial direction of the tool. A locking screw is received in the tool body for bringing the mutually cooperating clamping portions into mutual engagement.

The invention also pertains to a cutting tip adapted to be replaceably assembled in a cutting seat in a front end of a rotatable tool body. The tip has cutting edges for chip removing machining and support surfaces which cooperate with support surfaces of the cutting seat. The tip has guide surfaces configured symmetrically about a longitudinal center axis of the tip.

BRIEF DESCRIPTION OF THE DRAWINGS

Below, a preferred embodiment of a drill and a drill tip according to the present invention will be described, reference being made to the accompanying drawings, where.

DETAILED DESCRIPTION OF A PREFERRED EMBODIMENT OF THE INVENTION

Figure 1:
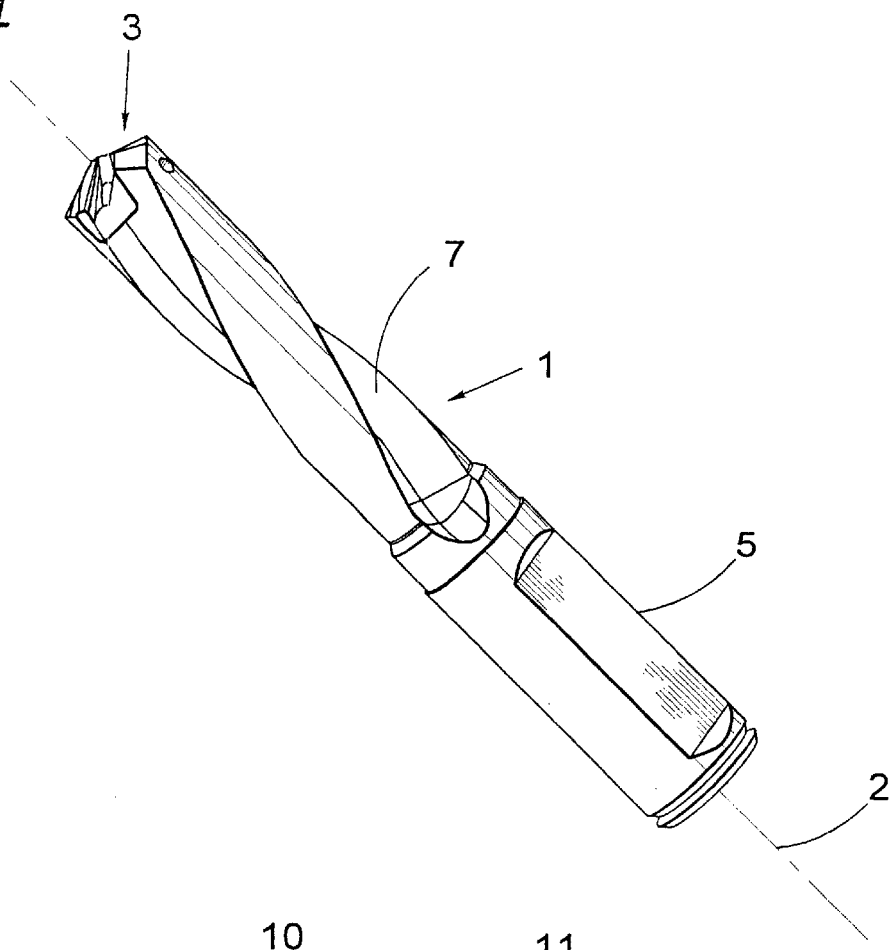
FIG. 1 shows a perspective view of a drill according to the present invention.

The drill according to the present invention illustrated in FIG. 1 comprises a drill body 1 and a replaceable drill tip 3. The drill body 1 is provided with a shank 5, and helicoidal chip channels 7 are arranged in the part of the drill body 1 which is situated between the shank 5 and the replaceable drill tip 3. The shank 5 is intended to be received in a holder in a machine tool. The front surface of the drill body 1, i.e. the surface in which the drill tip 3 is assembled, is generally conical.

Figure 2:
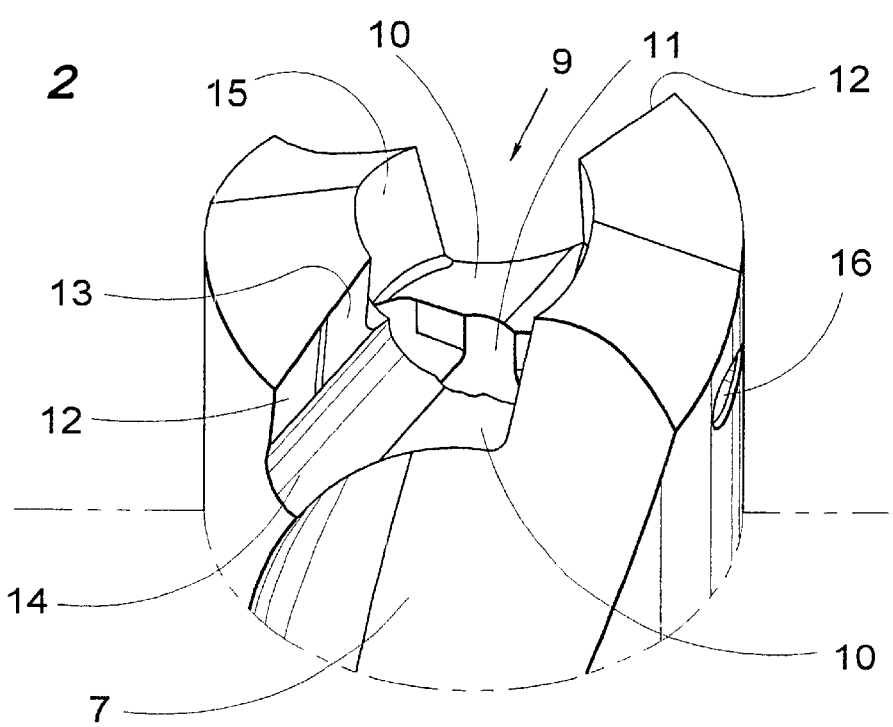
FIG. 2 shows a perspective view, obliquely from above, of the cutting seat in the drill body, in which a replaceable drill tip is intended to be received.
Figure 3:
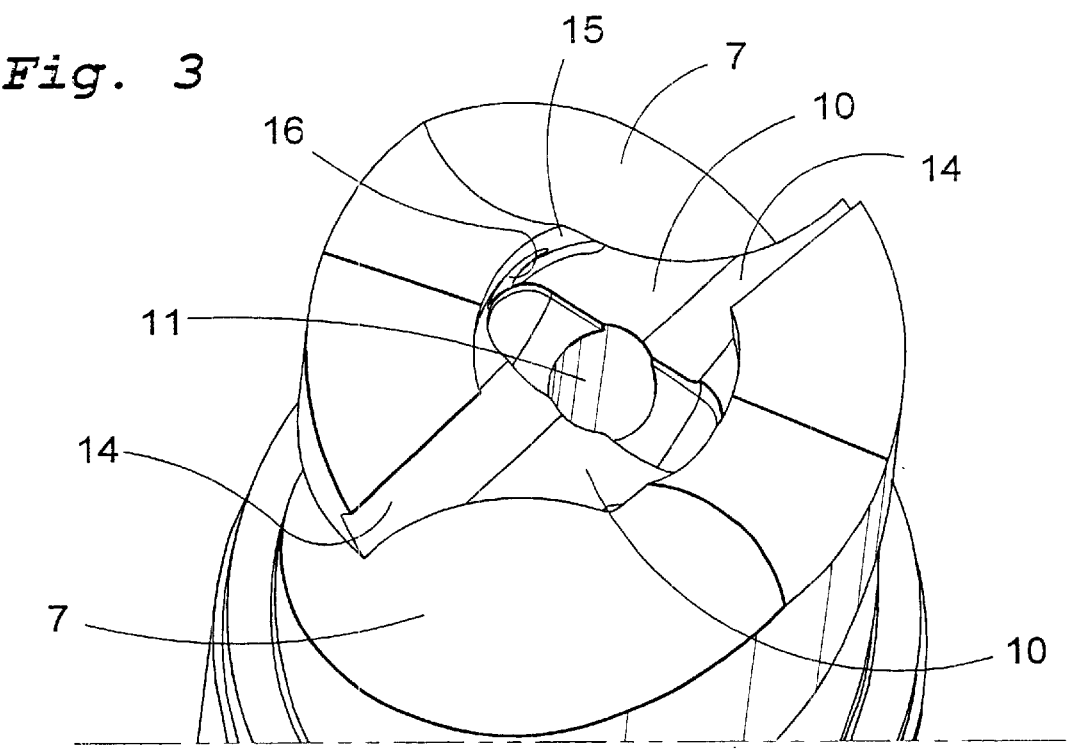
FIG. 3 also shows a perspective view, obliquely from above, of the cutting seat in the drill body according to FIG. 2, the cutting seat in FIG. 3 being seen more in an end view than in FIG. 2.
Figure 4:
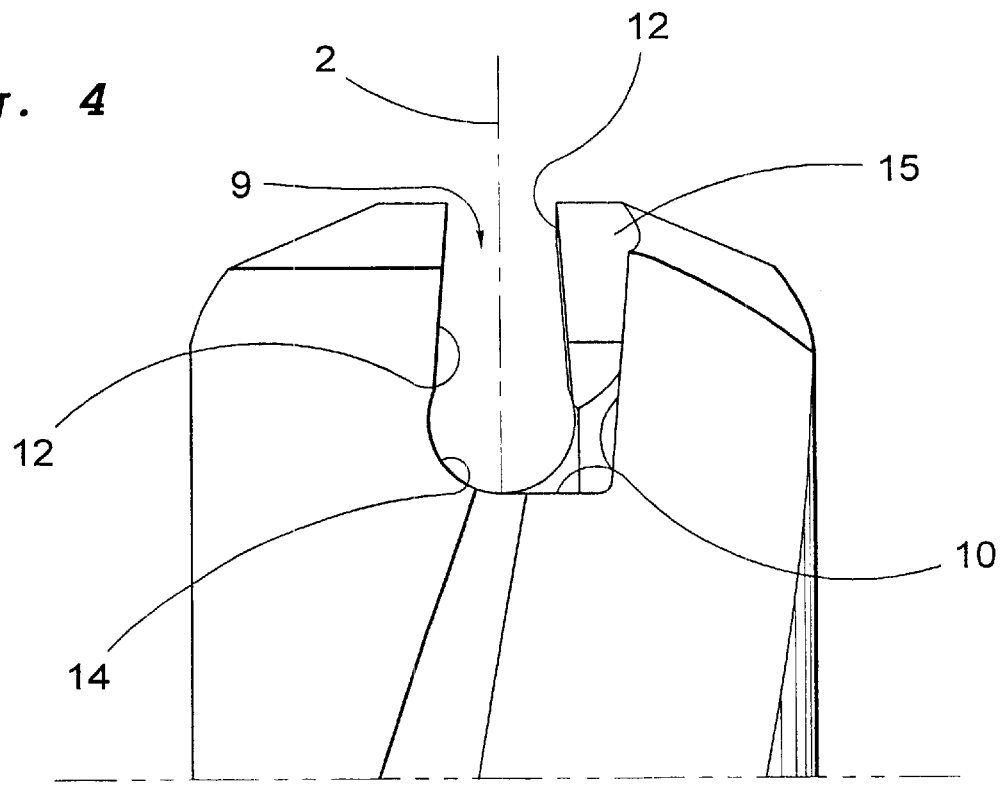
FIG. 4 shows a side view of the cutting seat in the drill body.

In FIGS. 2–4, a cutting seat 9 arranged in the drill body 1 is shown in more detail, the cutting seat 9 being arranged at the end of the drill body 1 which faces away from the shank 5. The cutting seat 9 of the drill body 1 comprises a plurality of different surfaces, which cooperate to give a satisfactory support in an optimal way for the replaceable drill tip 3 when this tip is assembled in the cutting seat 9. Thus, the cutting seat 9 comprises two internal, first support surfaces 10 for the replaceable drill tip 3, the first support surfaces 10 having an extension transverse to the longitudinal direction of the drill. The first support surfaces 10 are situated diametrically opposite one another with respect to a central cooling duct 11 of the drill body 1. Radially outwards, the first support surfaces 10 are delimited by the chip channels 7.

Furthermore, the cutting seat 9 comprises internal, second support surfaces 12 for the replaceable drill tip 3, said second support surfaces 12 forming an angle of approximately 5° to the rotation axis 2 of the drill (see FIG. 4), which also constitutes a longitudinal center axis 2 for the drill and for the replaceable drill tip 3. As is most clearly seen in FIG. 4, each second support surface 12 leans inwards towards the axis of rotation 2 in the direction of the open end of the cutting seat 9. The function of the second support surface 12 will be described in more detail below. A clearance surface 13 is situated radially inside each one of the second support surfaces 12. There are thus two clearance surfaces 13 which are situated diametrically opposite one another with respect to the central cooling duct 11. It is intended that the clearance surface 13 not abut against the replaceable drill tip 3 when this tip is assembled correctly in the cutting seat 9. The clearance surfaces 13 are parallel to the respective second support surfaces 12 and are offset therefrom in a direction away from the center of the drill.

Furthermore, the cutting seat 9 comprises two curved surfaces 14 extending radially, which bridge on the one hand, the surfaces 12 and 13 and on the other hand the surface 10. The curved surfaces 14 are not intended to abut against the replaceable drill tip 3 when this tip is assembled in the cutting seat 9.

Furthermore, the cutting seat 9 comprises two internal, first circular cylindrical guide surfaces 15, which are situated on diametrically opposite sides of the central cooling duct 11. The internal, first circular cylindrical guide surfaces 15 intersect respective clearance surfaces 13.

The drill body 1 has a hole 16 extending towards the center of the drill body 1, the said hole extending from the outside of the drill body 1 and intersecting one of the internal, first circular cylindrical guide surfaces 15. The radially extending hole 16 is intended to receive a locking screw 17, which is shown schematically in FIG. 5 together with the replaceable drill tip 3. The hole 16 should be internally threaded while the locking screw 17 has an external thread.

Figure 5:
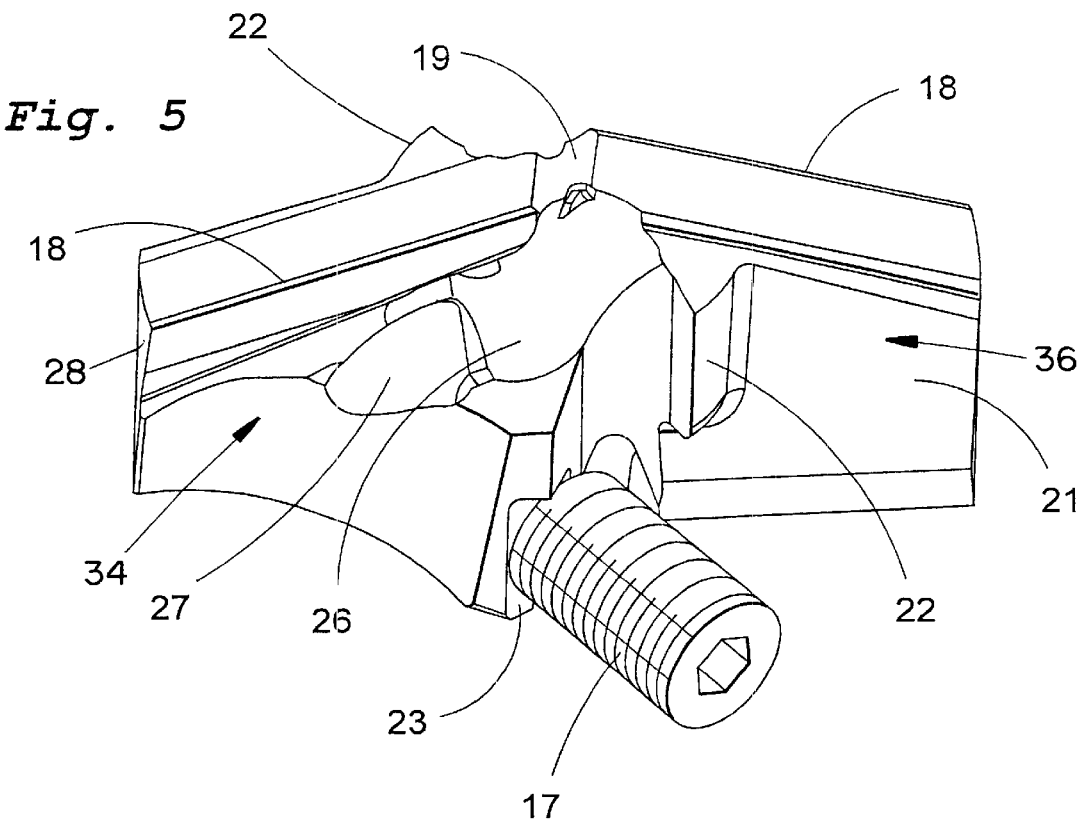
FIG. 5 shows a perspective view, obliquely from above, of the replaceable drill tip according to the present invention.
Figure 6:
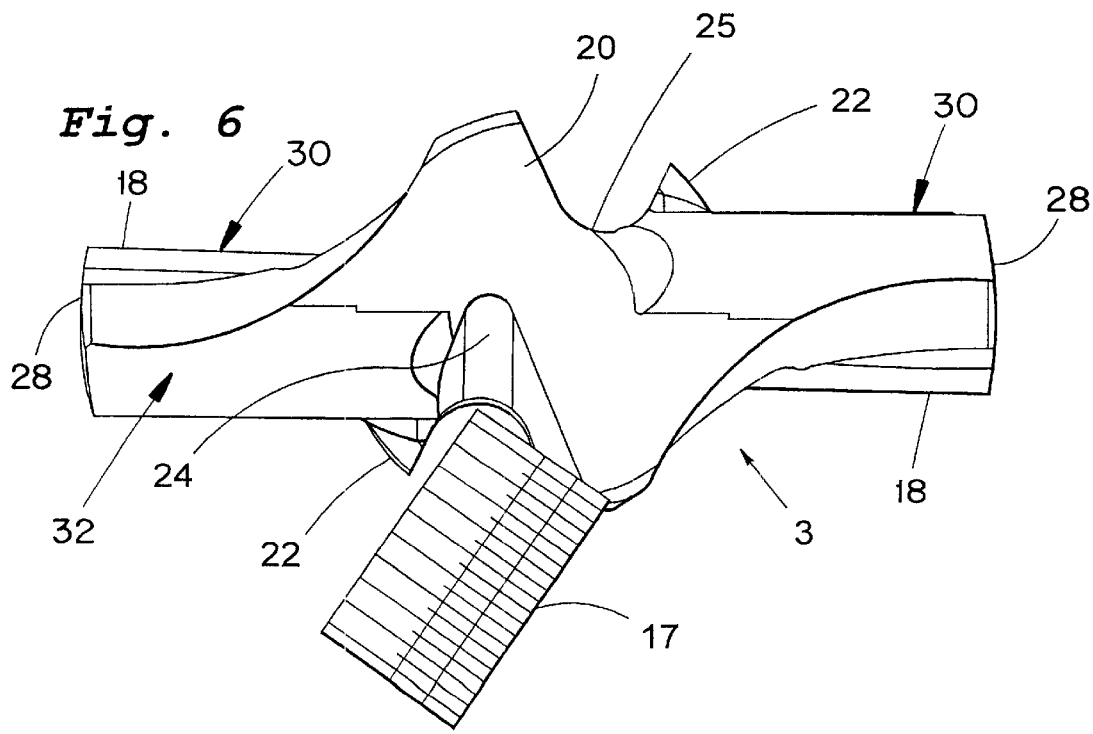
FIG. 6 shows a view from below of the replaceable drill tip according to FIG. 5.

The replaceable drill tip 3 is shown in FIGS. 5 and 6, the drill tip 3 having a generally elongated shape which fits into the cutting seat 9. Chip removing members in the form of two cutting edges 18 are arranged at the free end of the replaceable drill tip 3. In the assembled state of the drill tip in the cutting seat 9, each cutting edge extends from one of the opposing short sides 28 of the replaceable drill tip 3 to a cutting top 19 of the replaceable drill tip 3.

The replaceable drill tip 3 has two continuous, external, third support surfaces 20, see FIG. 6, situated on respective sides of the replaceable drill tip 3 that face away from respective ones of the cutting edges 18. The surfaces 20 cooperate with respective ones of the internal, first support surfaces 10 of the cutting seat 9.

The replaceable drill tip 3 also has two external, fourth support surfaces 21, which in the assembled state of the replaceable drill tip 3 are intended to come into abutment against the internal, second support surfaces 12 of the cutting seat 9. The external, fourth support surfaces 21 have, in that connection, in the assembled state of the replaceable drill tip 3, an inclination corresponding to that of the internal, second support surfaces 12 in relation to the longitudinal center axis 2 of the drill. In the embodiment illustrated, this inclination is approximately 5°.

For cooperation with the internal, first circular cylindrical guide surfaces 15, the replaceable drill tip 3 has two external, second circular cylindrical guide surfaces 22, which in the assembled state of the replaceable drill tip 3 in the cutting seat 9 come into cooperation with the internal, first circular cylindrical guide surfaces 15.

The replaceable drill tip 3 also has a stop face 23 which is abutted by the end of the locking screw 17 when the tip 3 is clamped in the cutting seat 9. The line of force of the locking screw 17 is offset from the longitudinal center axis 2 of the drill in order to effect rotation of the replaceable drill tip 3 when the same is assembled in the cutting seat 9, as explained below. Suitably, the line of force of the locking screw 17 forms an angle of approximately 30° to a radius of the body 1, the angle measured at the point where the axis of the hole 16 intersects the periphery of the tool body 1. In connection with the external, second circular cylindrical surfaces 22 of the replaceable drill tip 3, external, second and third cooling ducts 24 and 25 are arranged in the tip 3. The cooling duct 24 which is situated on the same side of the tip as the locking screw 17 has an increasing depth adjacent to the locking screw 17, in comparison with the cooling duct 25.

The replaceable drill tip 3 also has chip release surfaces 26, 27 in connection with the cutting edges 18 and the drill tip 19.

It will thus be appreciated that the drill tip defines a center longitudinal axis of rotation coinciding with the axis 2 of FIG. 1 and includes a pair of wings 30 extending symmetrically from that axis. Each wing includes a top side defined by a respective portion of the top side 19 of the tip, and an oppositely facing bottom side defined by a respective portion of a bottom side 32 of the tip. Each wing further includes a leading side 34 and a trailing side 36 facing in opposite directions and interconnecting the top side and the bottom side of the respective wing. Each cutting edge 18 is defined at an intersection between the top side and the leading side of the respective wing. The cutting edges 18 are spaced apart by about 180 degrees and face in a direction of rotation of the cutting tip. Each support surface 21 is defined by a radially outer portion of a respective trailing surface which extends to a radially outer peripheral guide surface 28 of the respective wing. Each support surface extends away from the top surface in a direction diverging from an imaginary plane P which contains the axis of rotation and which extends parallel to the cutting edges 18.

Figure 7:
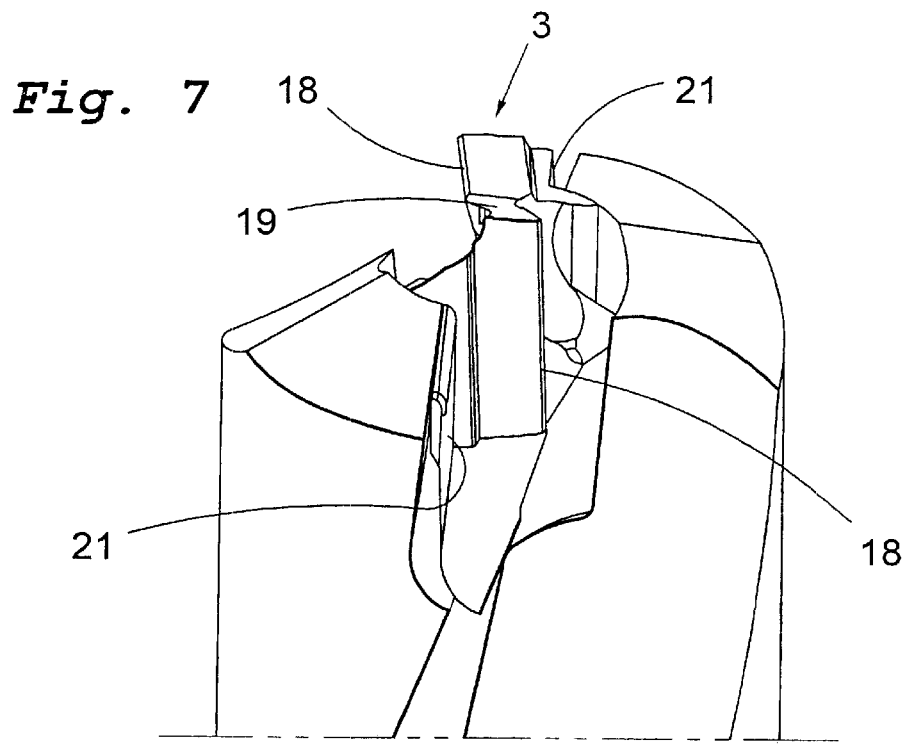
FIG. 7 shows a perspective view from the side of the drill body, of an initial stage wherein a replaceable drill tip is being assembled in the cutting seat.
Figure 8:
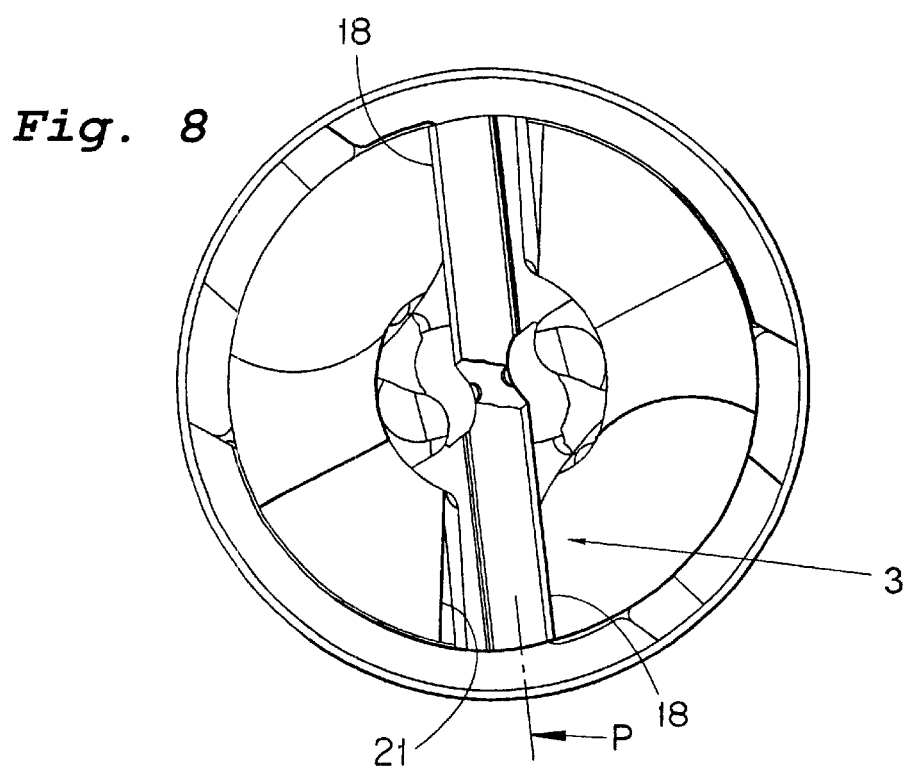
FIG. 8 shows a planar view of the stage of assembly of the replaceable drill tip shown in FIG. 7.
Figure 9:
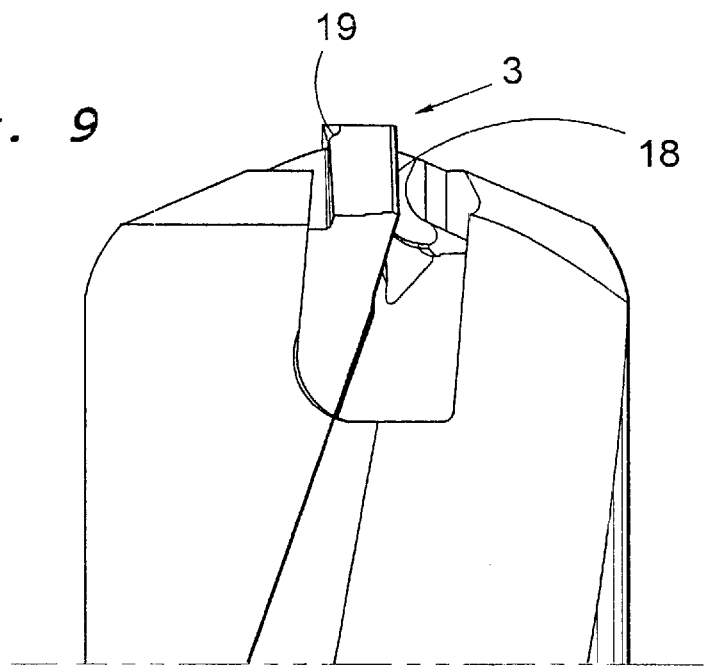
FIG. 9 shows a side view of the drill according to the present invention, i.e., the replaceable drill tip is assembled in the cutting seat of the drill body.
Figure 10:
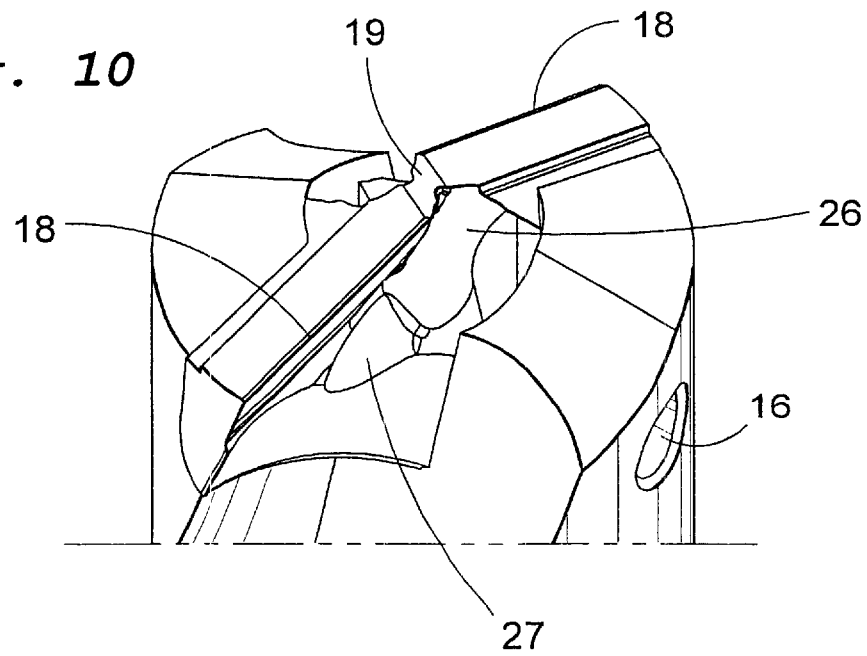
FIG. 10 shows a perspective view, obliquely from above, of the drill according to FIG. 9.

During assembly of the replaceable drill tip 3 in the cutting seat 9, the replaceable drill tip 3 is clamped in the cutting seat 9 in the way shown in FIGS. 7 and 8, i.e. the external, third support surfaces 20 of the replaceable drill tip 3 abut against respective internal, first support surfaces 10 of the cutting seat 9. In that connection, there has to be a certain tolerance between the internal, first circular cylindrical guide surfaces 15 of the cutting seat and the external, second circular cylindrical guide surfaces 22 of the replaceable drill tip 3. As is most clearly seen in FIG. 7, the replaceable drill tip 3 is, during the initial stage of the assembly, not turned to the final position thereof. Rather, there is a play between the internal, second support surfaces 12 of the cutting seat 9 and the external, fourth support surfaces 21 of the replaceable drill tip 3. On turning of the replaceable drill tip 3 clockwise in FIG. 8, the external, fourth support surfaces 21 come into abutment against the respective internal, second support surfaces 12. The turning may either take place manually or by the locking screw 17 abutting the stop face 23 of the replaceable drill tip 3. In case manual turning is used, a follow-up tightening operation has to take place by means of the locking screw 17 in order to guarantee that a satisfactory abutment is established between the internal, second support surfaces 12 and the respective external, fourth support surfaces 21. It is advantageous for the internal, second support surfaces 12 in the radial direction to be situated as far away as possible from the center of the drill body 1. Thereby, a better torque is obtained for the support force, by which the internal, second support surfaces 12 effect the respective external, fourth support surfaces 21 of the replaceable drill tip 3.

During the turning of the replaceable drill tip 3 clockwise in FIG. 8, also the internal, first circular cylindrical guide surfaces 15 will have a guiding cooperation with the respective external, second circular cylindrical guide surfaces 22, i.e. the replaceable drill tip 3 will rotate about the longitudinal center axis 2 of the drill according to the present invention.

During drilling with the drill according to the present invention, the cutting forces will act against the replaceable drill tip 3 in such a way that the tip is pressed against the internal, second support surfaces 12. Once the drilling has started, the cutting forces provide a clamping and centering of the replaceable drill tip 3 in the cutting seat 9, on one hand by cooperation between the support surfaces 12 and 21 and on the other hand between the guide surfaces 15 and 22. At that stage, the locking screw 17 has in principle no significance for the clamping of the replaceable drill tip 3 in the cutting seat 9.

In this connection, it should be pointed out that during the step when the replaceable drill tip 3 is assembled in the cutting seat 9, there occurs in principle no contact between the replaceable drill tip 3 and the clearance surfaces 13 or the radial, curved surfaces 14.

The replaceable drill tip 3 according to the present invention is preferably made from cemented carbide, the tip being sintered in a first step. Then, grinding of the geometry of the replaceable drill tip 3 is carried out in a geometry-grinding fixture having high accuracy. Preferably, the external, fourth support surfaces 21 and the external second circular cylindrical guide surfaces 22 are sintered, while grinding only is carried out on the cutting edges 18, the top 19 and the external third support surface 20.

When a replaceable drill tip 3 has been consumed, the locking screw 17 is loosened and a new replaceable drill tip 3 is assembled in the cutting seat 9.

It is typical for the tool according to the present invention that the tip be manufactured from cemented carbide, ceramics or another comparatively hard material. The tool body is manufactured from a comparatively softer material, preferably steel.

The tool according to the present invention is preferably intended for chip removing machining of metal, but it is fully possible to use the tool also for other materials in which the tool works.

FEASIBLE MODIFICATIONS OF THE INVENTION

In the above-described embodiment, the guide surfaces 15 and 22 are circular cylindrical while the support surfaces 12 and 21 lean at a certain angle in relation to the longitudinal center axis 2 of the drill. However, within the scope of the present invention it is also possible that the guide surfaces 15 and 22 could be slightly conical in relation to the longitudinal center axis of the drill while the support surfaces 12 and 21 have an extension parallel to the longitudinal center axis 2 of the drill. Then, cooperation between the conical guide surfaces 15 and 22 will clamp the replaceable drill tip 3 in the axial direction. In that case, the cone angle would be suitably on the order of 10°. It is typical that the guide surfaces 15 and 22 are rotationally symmetrical in respect of the longitudinal center axis 2 of the drill.

In the above-described embodiment, the support surfaces 12 and 21 have an inclination in relation to the longitudinal center axis 2 of the drill of approximately 5°. However, the size of this inclination/angle can be varied within the scope of the present invention, for example, the angle should be greater than 0° and less than 10°, preferably between 2° and 8°. The angle in question has to be acute. The same is true also in the case when the cooperating guide surfaces of the cutting seat and the replaceable drill tip, respectively, are conically formed, cone angle being greater than 5° and less than 15° in that case.

Although the present invention has been described in connection with a preferred embodiment thereof, it will be appreciated by those skilled in the art that additions, modifications, substitutions and deletions not specifically described may be made without departing from the spirit and scope of the invention as defined in the appended claims.

What is claimed is:

1. Rotatable tool having a replaceable tip mounted at a front end of the tool; the tool comprising a tool body having a cutting seat in which the tip is received; the tool body having chip channels for removing cuttings; the tip having cutting edges for chip removing machining; the cutting seat and the replaceable tip having mutually cooperating support surfaces extending both in the longitudinal direction of the tool and transversely to the longitudinal direction of the tool; the cutting seat and the replaceable tip having mutually cooperating guide surfaces configured symmetrically about a longitudinal center axis of the tool; the cutting seat and the replaceable tip having mutually cooperating clamping portions for clamping the replaceable tip in the axial direction of the tool; a locking screw is received in the tool body for bringing the mutually cooperating clamping portions into mutual engagement.

2. The tool according to claim 1, wherein the mutually cooperating clamping portions comprise cooperating support surfaces of the cutting seat and the replaceable tip, respectively, said support surfaces forming an acute angle with the longitudinal center axis of the tool.

3. The tool according to claim 2, wherein the acute angle is about 5°.

4. The tool according to claim 1 wherein the mutually cooperating guide surfaces are of circular cylindrical shape.

5. The tool according to claim 1, wherein the mutually cooperating clamping portions comprise cooperating guide surfaces of the cutting seat and the replaceable tip, respectively, the guide surfaces being conical and coaxial with the longitudinal center axis of the tool.

6. The tool according to claim 5, wherein the cone angle is about 10°.

7. A cutting tip adapted to be replaceably assembled in a cutting seat in a front end of a rotatable tool body, the cutting tip defining a longitudinal center axis of rotation and including a pair of wings extending symmetrically from the axis; each wing including a top side, a bottom side, a leading side and a trailing side; the top side disposed opposite the bottom side; the leading side and the trailing side facing in opposite directions and interconnecting the top side with the bottom side; cutting edges defined generally at an intersection between the top side and respective ones of the leading sides and spaced angularly apart by about 180 degrees; both cutting edges facing in a direction of rotation defined by the cutting tip; each trailing surface including a radially outer support surface extending substantially to a radially outer peripheral guide surface of the respective wing; each support surface extending away from the top surface in a direction diverging from an imaginary plane which contains the center axis and which extends substantially parallel to the cutting edges.

8. The tip according to claim 7, wherein the guide surfaces are of circular cylindrical shape.

9. The tip according to claim 7, wherein the guide surfaces are of conical shape.

10. The tip according to claim 9 wherein the cone angle of the conical shape is about 10°.

* * * * *